March 4, 1930.  M. F. SMITH ET AL  1,749,516
CLUTCH
Filed May 2, 1929   2 Sheets-Sheet 1
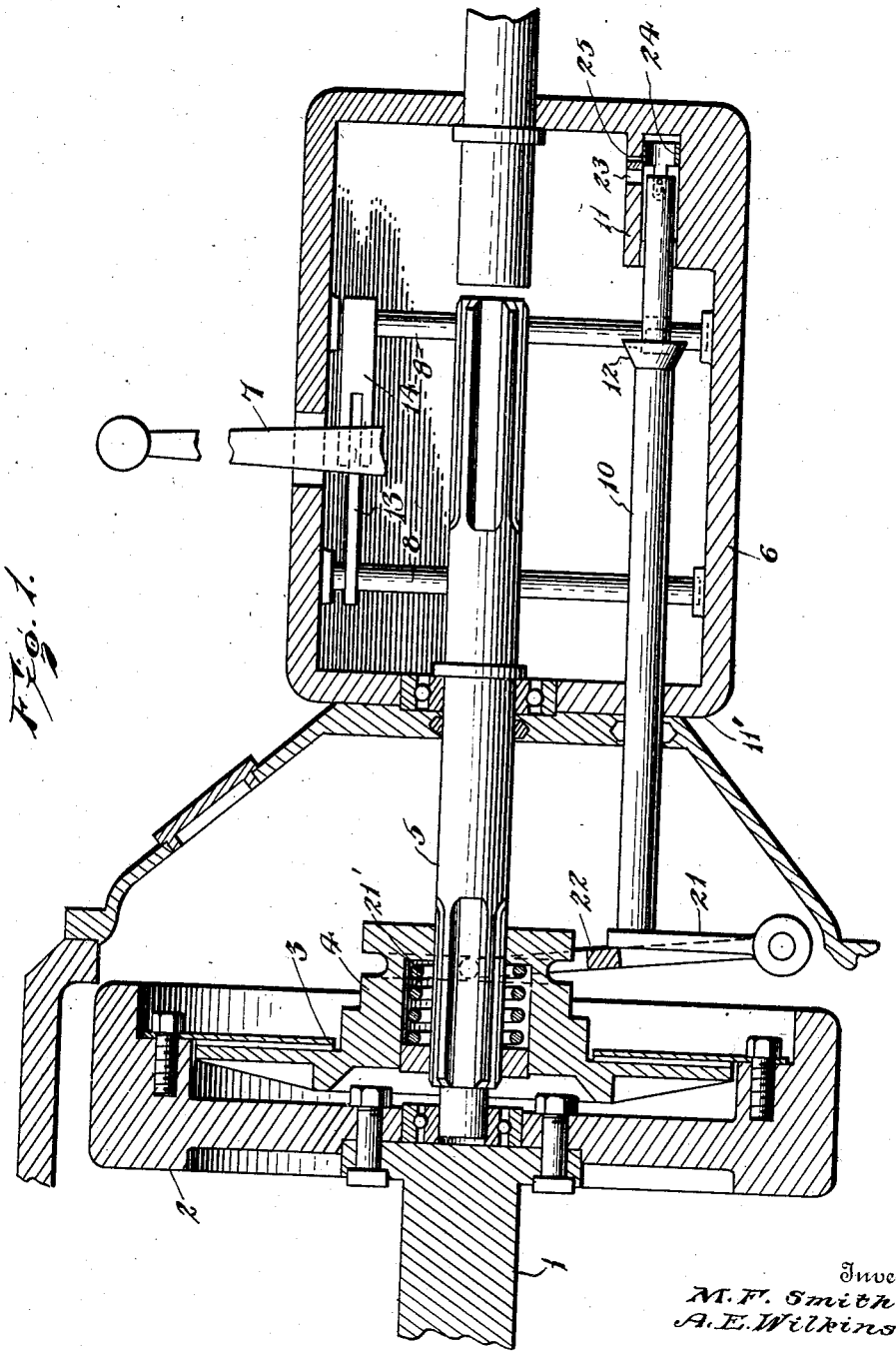
Inventor
M. F. Smith
A. E. Wilkins
By Lacey & Lacey, Attorneys

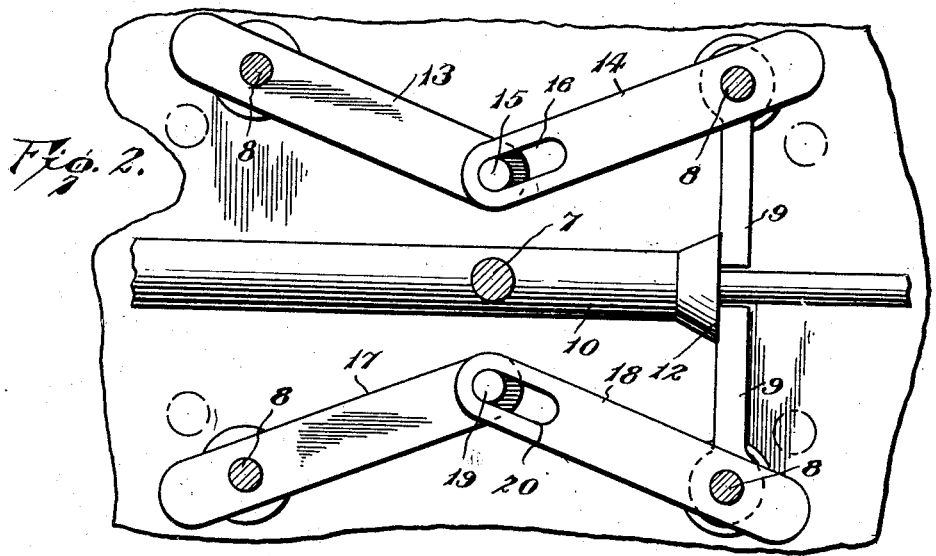
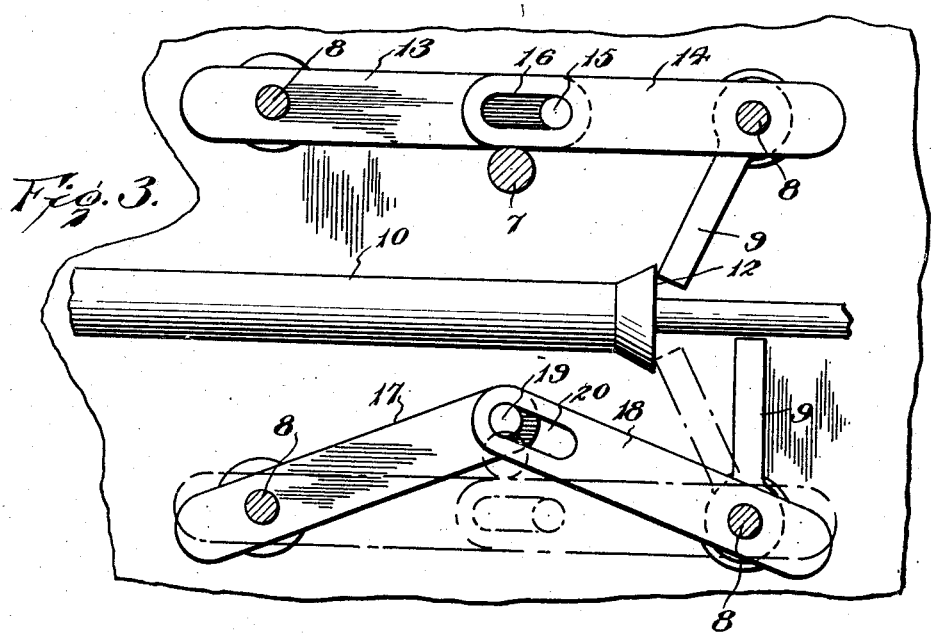
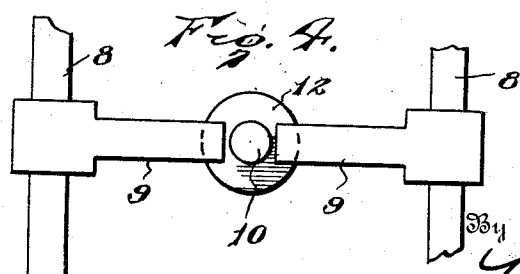

Patented Mar. 4, 1930

1,749,516

UNITED STATES PATENT OFFICE

MARION F. SMITH AND ADELBERT E. WILKINS, OF LANSING, MICHIGAN

CLUTCH

Application filed May 2, 1929. Serial No. 359,924.

The present invention is directed to improvements in clutches and particularly to that type used in connection with motor vehicles.

The primary object of the invention is to provide a device of this character so arranged that when the shift lever is actuated to change gears, the clutch will be automatically disengaged.

Another object of the invention is to provide a device of this character which can be placed in the transmission case in position to permit the lower end of the shift lever, when swung for shifting the gears, to actuate the controlling bars for automatically disengaging the clutch.

Another object of the invention is to provide a device of this character so constructed that the clutch will be disengaged each time it is desired to shift gears without the necessity of using the conventional clutch pedal.

Another object of the invention is to provide a device of this character which is simple in construction, efficient in operation, durable, and one which can be manufactured at a small cost.

With these and other objects in view, this invention resides in the novel features of construction, formation, combination and arrangement of parts to be hereinafter more fully described, claimed and illustrated in the accompanying drawings, in which:

Figure 1 is a longitudinal sectional view through the transmission case and clutch mechanism.

Figure 2 is a plan view of the clutch control mechanism, shown somewhat diagrammatically, the clutch controlling mechanism being shown in position when the shift lever is in neutral.

Figure 3 is a similar view showing one position of the controlling mechanism.

Figure 4 is a fragmentary rear view.

Referring to the drawings, the numeral 1 designates the engine shaft having the usual flywheel 2 connected therewith. Connected with the flywheel is a conventional form of clutch mechanism 3 including the shifting collar 4 for controlling the operation of the transmission shaft section 5. This shaft extends into the transmission casing 6 and has associated therewith the usual transmission gears and since the gear arrangement is conventional, illustration thereof has been eliminated for the sake of clearness. Extending into the case 6 is the lower end of the usual gear shift lever 7 having lateral movement. Rotatably mounted in the case 6 are vertical posts 8, four in number, and arranged in pairs upon opposite sides of the shaft 5, the rear post of each pair having formed integral therewith fingers 9, the purpose of which will later appear.

A clutch controlling shaft 10 is provided and is slidable in the bearings 11 of the case and has its rear end slidably supported in the housing 11' formed in the case 6. This shaft has formed near its rear end, an annular shoulder 12 which is adapted to engage the fingers 9.

Fixed to the upper ends of the posts 8 upon one side of the shaft 5 are bars 13 and 14, the bar 13 having a stud 15 carried thereby for slidably engaging the slot 16 formed in the bar 14. The posts 8 upon the opposite side of the shaft 5 have fixed to their upper ends, bars 17 and 18, the bar 17 having a lug 19 for engagement in the slot 20 in the bar 18. Obviously, the stud and slot connection pivotally and slidably connects the respective bars so that they may be moved from angular relationship into direct alignment, as the occasion requires.

The forward end of the shaft 10 is connected with an arm 21 adapted to engage the clutch shifting yoke 22 of conventional form for throwing the clutch structure out when the shaft 10 is shifted forwardly.

As shown in Figure 2, the shift lever 7 is in neutral position and the respective bars are in angular relationship. When the shift lever 7 is moved from neutral to low gear, the lower end thereof will engage the jointed ends of the bars 13 and 14, thus moving them from angular position into direct alignment, as shown in Figure 3. The bar 14 will swing, thus rotating the associated post so that the finger 9 carried thereby will swing forwardly, and since this finger engages the shoulder 12, the shaft 10 will be moved forwardly, thus disengaging the clutch. The lever will obviously slide along the bar 13 until the low gear is obtained, whereupon the shaft 10, under the action of the clutch spring 21', will move rearwardly, thus swinging the finger 9 to a position to again engage the shoulder. When the shift lever is swung for shifting into second gear the lower end will engage the bars 17 and 18 for swinging the associated finger to shift the bar 10 to disengage the clutch.

The housing 11' has an opening 23 in order that oil from the transmission case, or other fluid, can enter the housing, and slidably connected with the rear end of the shaft 10 is a sleeve 24 which will close the opening 23 when the shaft 10 moves forwardly. This sleeve, when the shaft 10 is in its rearmost position, will cover the vent 25. This construction acts in the nature of a dash pot for retarding the rearward movement of the shaft 10 to prevent "grabbing" of the clutch when quickly engaged.

What is claimed is:

1. The combination with the clutch and transmission mechanism of a motor vehicle, of a shaft movable longitudinally for disengaging the clutch, rotatably mounted posts in the transmission case, bars fixed to the ends of the posts and arranged in pairs upon opposite sides of the shaft, said bars being pivotally and slidably connected at adjacent ends, said bars being operable by the gear shift lever for rotating the posts, and means carried by certain of the posts for shifting the shaft to disengage the clutch.

2. The combination with the clutch and transmission mechanism of a motor vehicle provided with a gear shift lever having lateral movement, of a shaft slidably mounted in the transmission case, posts rotatably supported upon opposite sides of the shaft, bars fixed to the upper ends of the posts on the same side of said shaft and pivotally connected together in the lateral path of the gear shift lever, a shoulder carried by the shaft, fingers fixed to certain of the posts for engagement with the shoulder to shift the shaft forwardly to disengage the clutch when the shift lever of the transmission mechanism engages the bars.

3. The combination with the clutch and transmission mechanism of a motor vehicle, of a shaft movable longitudinally within the transmission case for disengaging the clutch, posts rotatably mounted at opposite sides of the shaft and arranged in pairs, each pair of posts having bars fixed to their upper ends and having their adjacent ends slidably and pivotally connected, said bars being normally arranged in angular relation, fingers carried by certain of the posts, a shoulder carried by the shaft for engagement with the fingers, said fingers being rockable when the shift lever of the transmission mechanism engages selected bars to move said bars from angular relation into alignment for actuating the fingers to move the shaft forwardly to disengage the clutch.

4. The combination with the clutch and transmission mechanism of a motor vehicle, of a shaft slidable in the transmission case, posts rotatably mounted upon opposite sides of the shaft and arranged in pairs, said shaft having a shoulder carried thereby, certain of the posts having fingers rigidly connected therewith for engagement with the shoulder, bars having their upper ends fixed to the posts, the inner ends of said bars being pivotally and slidably connected to each other and movable from angular relation into alignment upon lateral movement of the shift lever of the transmission mechanism for actuating the fingers for forcibly engaging the shoulder to shift the shaft in a direction to disengage the clutch.

5. The combination with the clutch and transmission mechanism of a motor vehicle, of a shaft movable longitudinally in the transmission case and having a shoulder carried thereby, posts disposed in pairs and arranged upon opposite sides of the shaft and rotatably supported in the transmission case, certain of the posts having fingers fixed to their lower ends, each pair of posts having bars fixed to their upper ends, said bars having their adjacent ends slidably and pivotally connected and normally disposed in angular relationship, a yoke connected with the clutch mechanism, said shaft having one end connected with the yoke for sliding the yoke to cause disengagement of the clutch when one of the fingers is operated to engage the collar to shift the shaft forwardly, said bars being moved from angular relationship to alignment upon movement of the transmission shift lever.

6. The combination with the clutch and transmission mechanism of a motor vehicle provided with a gear shift lever having lateral movement, of a longitudinally movable shaft, a plurality of rotatably mounted posts, bars fixed to the upper ends of said posts and pivotally connected together in the lateral path of the gear shift lever, and means carried by certain of the posts for sliding the shaft to disengage the clutch upon engagement of the bars by the gear shift lever.

In testimony whereof we affix our signatures.

MARION F. SMITH. [L. S.]
ADELBERT E. WILKINS. [L. S.]